C. S. LOCKWOOD.
ROLLER BEARING FOR SIDE AND END THRUST.
APPLICATION FILED APR. 28, 1910.
980,427.
Patented Jan. 3, 1911.
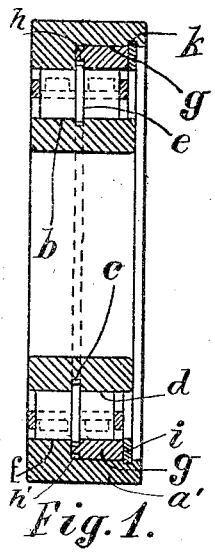
Fig. 1.
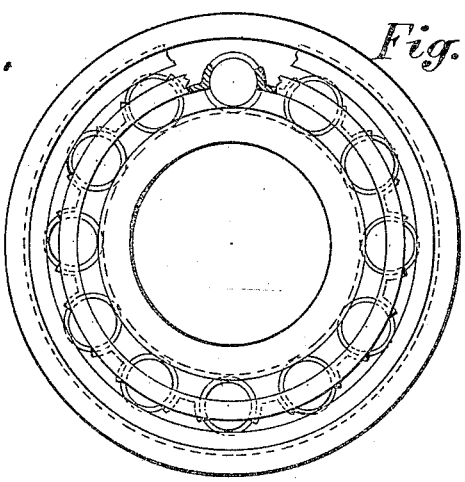
Fig. 2.
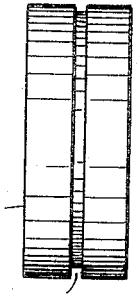
Fig. 3.
Fig. 4.
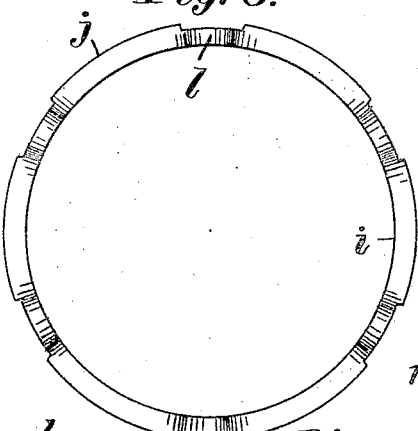
Fig. 8.
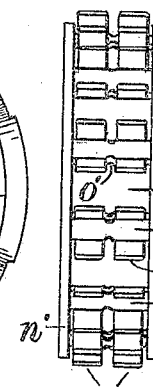
Fig. 6.
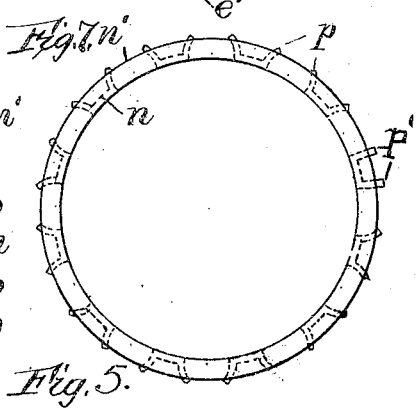
Fig. 7.
Fig. 5.
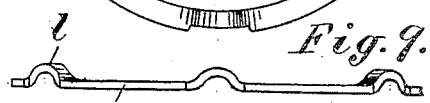
Fig. 9.
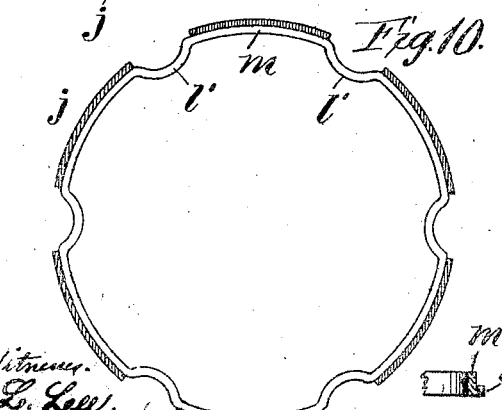
Fig. 11.
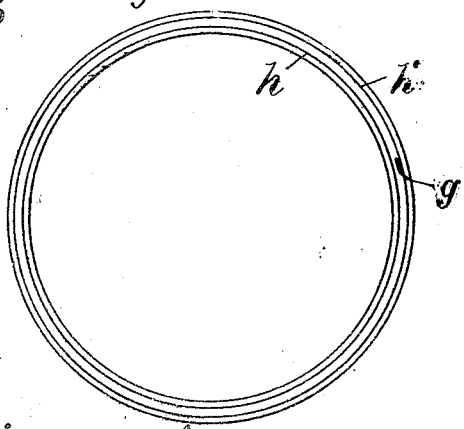
Fig. 10.
Witnesses:
L. Lell
J. Walter Oppenheim
Inventor.
Charles S. Lockwood Jr.
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING FOR SIDE AND END THRUST.

980,427.  Specification of Letters Patent.  Patented Jan. 3, 1911.

Application filed April 28, 1910. Serial No. 558,227.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings for Side and End Thrust, fully described and represented in the following specification and the accompanying drawings, forming a part of the same.

This invention relates to a roller bearing in which the rolls are contained in a casing divided transversely having one part extended as a shell over the other part to embrace the same and hold it concentric with the hub of the bearing.

The invention furnishes an improved means for retaining the two parts of the divided casing together consisting of a groove upon the interior of the shell and a narrow ring having segments adapted to force into such groove, and arched portions intermediate to the said segments adapted when pressed to expand the segments into the groove. Such construction makes the roller bearing a unitary structure after the casing is assembled upon the rolls and the hub.

The invention also includes a sheet-metal cage of special construction adapted to embrace a series of rolls to divide the same in their bearing, the slots having notches at their edges to admit collars upon the rolls, and lugs at the sides of the slots adapted to hold the rolls upon the hub when removed from the casing. Such a cage facilitates the assembling of the parts and their examination and repairs.

The construction will be understood by reference to the annexed drawing, in which—

Figure 1 is a longitudinal section of a bearing embodying the invention, the section plane being taken between adjacent rolls; Fig. 2 is an end view of the bearing with a portion of the cage broken away; Fig. 3 is an elevation of the hub; Fig. 4 is an elevation of one of the rolls; Fig. 5 is an elevation of the separate bearing-ring viewed at its rabbeted end; Fig. 6 is a side elevation and Fig. 7 an end elevation of the cage; Fig. 8 is an end elevation and Fig. 9 an edge view of a locking flange with radial arches or corrugations; Fig. 10 is a side view, and Fig. 11 a cross section of a locking-flange with longitudinal corrugations.

The hub $a$ is shown with a groove $c$ at the middle of its length and cylindrical seats $b$ at opposite sides of the groove. Each roll has a collar $e$ about the middle to fit the groove $c$ and cylindrical bearing surfaces at opposite sides of the collar.

The casing has at one end an integral bearing-seat $f$ fitted to the bearing surface upon one end of the rolls, and the other end is formed as an annular shell forming an annular recess $g'$ in which a separate bearing-ring $g$ is inserted and fitted to the bearing surface upon the other end of the rolls.

The collars $e$ fit between the bottom of the recess and the inner end of the ring $g$. To retain this bearing-ring in its working position within the casing, an annular groove $k$ is shown in Fig. 1 upon the inner side of the shell at the outer end of the bearing-ring, and an annular ring $i$ is shown with locking segments $j$ extended into such groove to hold the bearing-ring in place.

The locking-flange is made expansible by forming upwardly curved portions $l$ upon the ring intermediate to the peripheral segments, and the exterior of the segments $j$ are made primarily to fit into the recess $g'$ of the shell and adapted to be crowded outwardly into the groove $k$ by flattening or pressing inwardly the curved portion $l$. This expands the curved portions and enlarges the ring $i$ so as to crowd the segments into the groove.

With the constructions shown in Figs. 8 and 9, the ring or annular flange $i$ is in the same plane with the peripheral segments; but in Figs. 10 and 11, the ring is shown at right angles to the segments, being formed as a thin hub $m$ with longitudinal arches $l'$ formed therein intermediate to the peripheral segments $j$. The operation of this construction is the same as that shown in Fig. 9, the segments being forced outwardly by crowding the arches radially to expand the ring $i$. When the bearing-ring $g$ is thus retained in the casing, the engagement of the collars $e$ upon the rolls with the grooves in the hub and casing enables the hub and casing to resist end movement in relation to one another in a considerable degree, although not intended for use as a thrust-bearing, and a cage to guide such rolls requires the special construction as shown in Figs. 2, 4 and 7, in which a cylindrical shell n is shown formed of sheet-metal with slots o punched in it to receive the rolls, and two tongues p at opposite sides of the slots to fit over the outer sides of the collars e.

Notches o' are formed in the sides of the slots between the tongues to admit the collars upon the rolls, and as the shell is cut away by the formation of the slots o, it requires strengthening and stiffening, which is effected, without increasing its length, by flat flanges n' which are in practice spun upon its opposite ends before the slots and tongues are punched. The tongues are cut from the opposite sides of the slots when they are punched, and the tongues are first bent radially outward, as shown upon two of the tongues p' in Fig. 7, which permits the rolls to be inserted through the slots into contact with the hub and into engagement with the grooves c therein, and the tongues are then bent over the body of each roll, as shown upon the remainder of the cage in Fig. 7, and also in Fig. 2, to keep the rolls upon the hub when handled apart from the casing.

In practice, the rolls and bearing surfaces are hardened and ground to the required dimensions, and the grinding of the bodies of the rolls adjacent to the opposite sides of the collars e is facilitated by making a small groove e' in the body adjacent to the collar, which is shown only in Fig. 4, and avoids the necessity of grinding a square corner, which no grinder would do continuously on account of wear.

When the parts are assembled and secured together as described herein, they produce a roller-bearing which can be handled without the loss of any of its parts and which is adapted to fit into a cylindrical socket in any mechanical structure, the hub a being secured upon the shaft which needs the antifriction support.

Fasteners for bottle corks have been made by corrugating a soft metal ring which thus becomes wholly expansible, but it is obvious from the above description that the locking segments j in my construction are non-expansible, whether made in the plane of the ring as in Fig. 8, or at right angles thereto as in Figs. 10 and 11, the ring to which they are attached being the only expansible portion and rendered so by the arches intermediate to the segments. This construction is especially adapted for expanding a ring made of thick metal, that is one-sixteenth of an inch thick, and possessing flat lugs or segments adapted to fit snugly in the groove k. Such lugs would not be flat if the ring were wholly corrugated, and it could not be readily flattened when set within the casing for expanding it into the groove. It made one-sixteenth of an inch thick and wholly corrugated. The construction thus furnishes flat segments adapted to fit the plane of the groove and one which can be readily expanded when the locking-ring is set within the casing.

Having thus set forth the nature of the invention what is claimed herein is:

1. In a roller-bearing, the combination, with a cylindrical hub having a transverse groove intermediate the ends, of a series of cylindrical rolls fitted to such hub and having each at the middle of its length a collar fitted to such groove, a casing having an integral cylindrical seat fitted to the rolls at one side of the collars and a separate bearing-ring g fitted within the casing with a groove k in the casing at the outer end of such bearing-ring, and a locking-flange having a narrow annular body i with projecting segments j upon its periphery adapted to engage the groove k, and the body having arched portions intermediate to the said segments adapted when pressed to expand the segments into the groove.

2. A roller-bearing having a hub, a set of rolls fitted thereto and a casing having at one end an integral bearing-seat to fit the rolls and a shell upon the other end with a separate bearing-ring g therein, with a groove k in the shell at the end of such bearing-ring, a locking flange having a narrow annular flat body i with segments j projecting from its periphery in the same plane as the ring and the body having radial arched portions intermediate to the said segments adapted when pressed to the plane of the ring to expand the segments into the groove.

3. A roller bearing having a cylindrical hub with transverse groove intermediate to the ends, a series of cylindrical rolls fitted to such hub and having each at the middle of its length a collar fitted to such groove, a casing encircling the rolls, and a cage having a cylindrical shell n with flat strengthening flanges n' spun upon the ends and the shell being slotted to accommodate the rolls, with tongues projecting from the longitudinal edges of the slots in the shell to partially embrace the rolls and notches in the same edges of the slots to accommodate the collars on the rolls.

In testimony whereof I have hereunto set my hand in the presence of two subscribing witnesses.

CHARLES S. LOCKWOOD.

Witnesses:
EDWARD H. MAROT,
IREY W. ASLIN.